US008184019B2

(12) United States Patent
Chauvin et al.

(10) Patent No.: US 8,184,019 B2
(45) Date of Patent: May 22, 2012

(54) DATA COLLECTION SYSTEM FOR ELECTRONIC PARKING METERS

(75) Inventors: Gregory Emile Chauvin, Brookside (CA); Neil Stuart Erskine, Halifax (CA); George Allan Mackay, New Glasgow (CA)

(73) Assignee: J.J. MacKay Canada Limited (CA)

( * ) Notice: Subject to any disclaimer, the term of this patent is extended or adjusted under 35 U.S.C. 154(b) by 439 days.

(21) Appl. No.: 12/430,733

(22) Filed: Apr. 27, 2009

(65) Prior Publication Data

US 2009/0267732 A1 Oct. 29, 2009

Related U.S. Application Data

(60) Provisional application No. 61/048,133, filed on Apr. 25, 2008.

(51) Int. Cl.
*G08G 1/14* (2006.01)
(52) U.S. Cl. ............ 340/932.2; 235/380; 235/486; 340/928; 705/13
(58) Field of Classification Search ............ 340/932.2, 340/928, 5.53, 10.4, 5.74; 705/13; 701/117; 235/380, 486; 194/344, 346
See application file for complete search history.

(56) References Cited

U.S. PATENT DOCUMENTS

| | | | |
|---|---|---|---|
| 5,155,614 A * | 10/1992 | Carmen et al. | 398/202 |
| 5,259,491 A * | 11/1993 | Ward, II | 194/350 |
| 5,266,947 A | 11/1993 | Fujiwara et al. | |
| 5,500,517 A | 3/1996 | Cagliostro | |
| 5,614,892 A * | 3/1997 | Ward et al. | 340/870.02 |
| 6,037,880 A | 3/2000 | Manion | 340/932.2 |
| 6,052,453 A * | 4/2000 | Sagady et al. | 379/146 |
| 6,082,153 A | 7/2000 | Schoell et al. | |
| 6,275,170 B1 | 8/2001 | Jacobs et al. | 340/932.2 |
| 6,477,875 B2 | 11/2002 | Field et al. | |
| 6,823,317 B1 | 11/2004 | Ouimet et al. | 705/13 |
| 7,330,131 B2 | 2/2008 | Zanotti et al. | 340/932.2 |
| 2002/0030606 A1 | 3/2002 | Chauvin et al. | |
| 2002/0134645 A1* | 9/2002 | Alexander et al. | 194/351 |
| 2006/0136131 A1 | 6/2006 | Dugan et al. | 701/300 |
| 2006/0152385 A1 | 7/2006 | Mandy | |
| 2007/0171069 A1 | 7/2007 | Allen | 340/572.1 |
| 2008/0158010 A1 | 7/2008 | Nath et al. | 340/932.2 |

(Continued)

FOREIGN PATENT DOCUMENTS

CA 2260925 1/1998

(Continued)

OTHER PUBLICATIONS

StreetSmart Technology, LLC, "Technical Specifications and System Features for the StreetSmart Solution" Brochure.

*Primary Examiner* — Brent Swarthout
(74) *Attorney, Agent, or Firm* — Hayes Soloway P.C.

(57) ABSTRACT

There is disclosed a single space parking meter that includes a low powered radio for communicating with a mobile access point. There is also provided a parking meter management system comprising a single space parking meter and a mobile access point. The mobile access point comprises a coin collection cart, and a mobile data collection terminal including a wireless radio for communicating with the wireless radio of the single space parking meter. Also disclosed is a method of managing single space parking meters comprising the steps of collecting and storing meter information in a single space parking meter, receiving at a main electronics board of the single space parking meter a transmit signal, and transmitting the meter information to a mobile access point using a low powered radio of the single space parking meter.

8 Claims, 12 Drawing Sheets

| U.S. PATENT DOCUMENTS | | | |
|---|---|---|---|
| 2008/0165030 A1 | 7/2008 | Kuo et al. | 340/932.2 |
| 2008/0291054 A1 | 11/2008 | Groft | 340/932.2 |

FOREIGN PATENT DOCUMENTS

| CA | 2227833 | 7/1998 |
|---|---|---|
| CA | 2346908 | 4/2000 |
| CA | 2352968 | 1/2001 |
| WO | 98/04080 | 1/1998 |
| WO | 01/69541 | 9/2001 |
| WO | WO 2007/063530 | 7/2007 |

\* cited by examiner

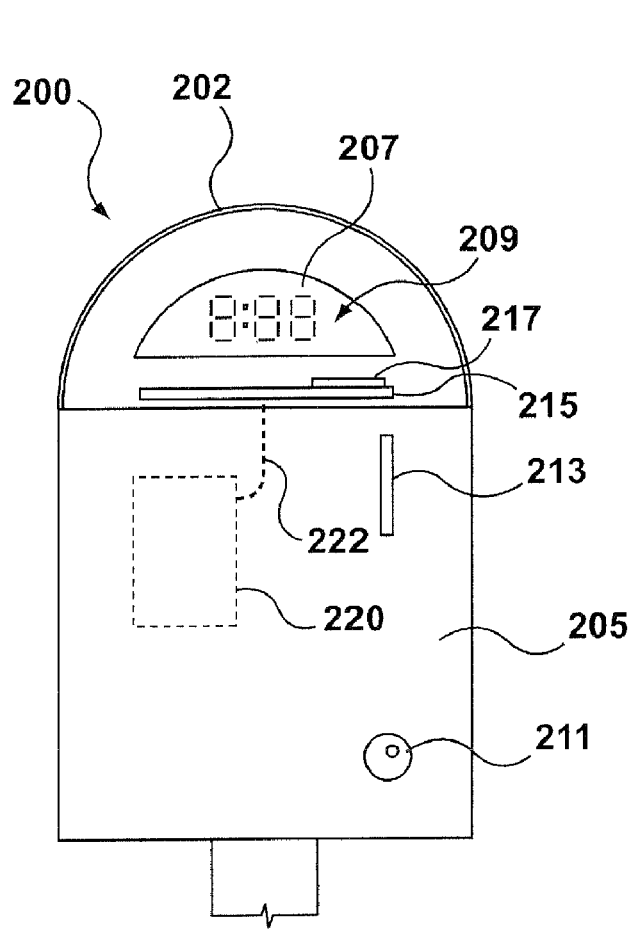
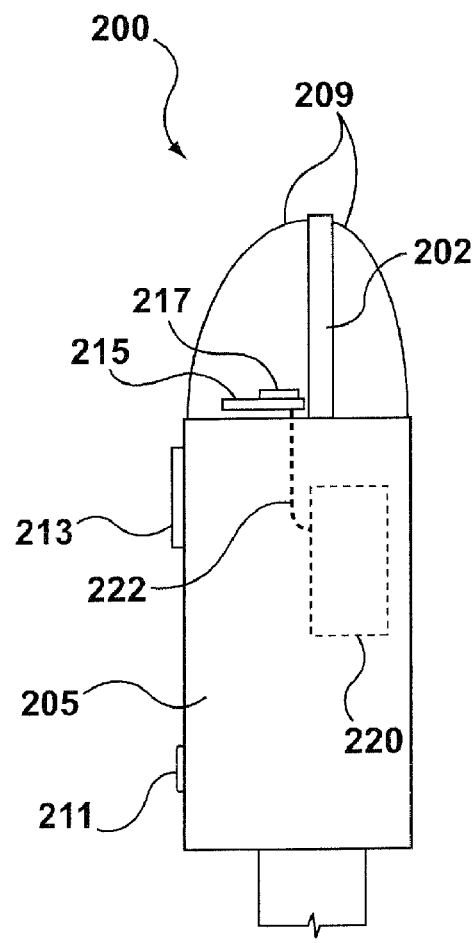
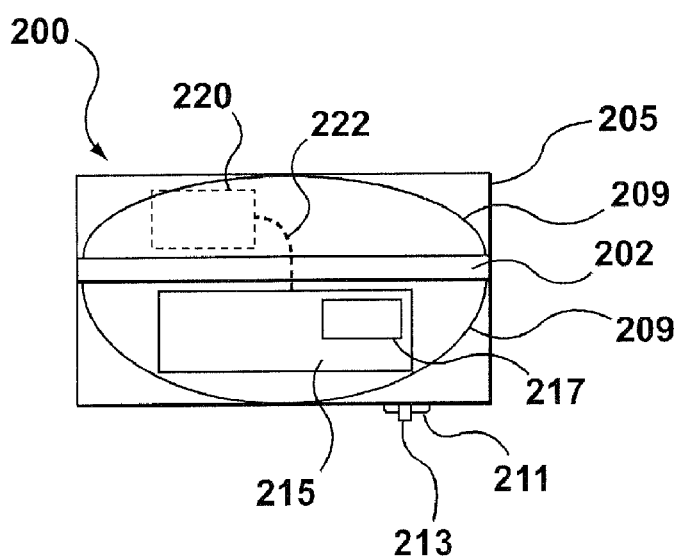
FIG. 2a
FIG. 2b
FIG. 2c

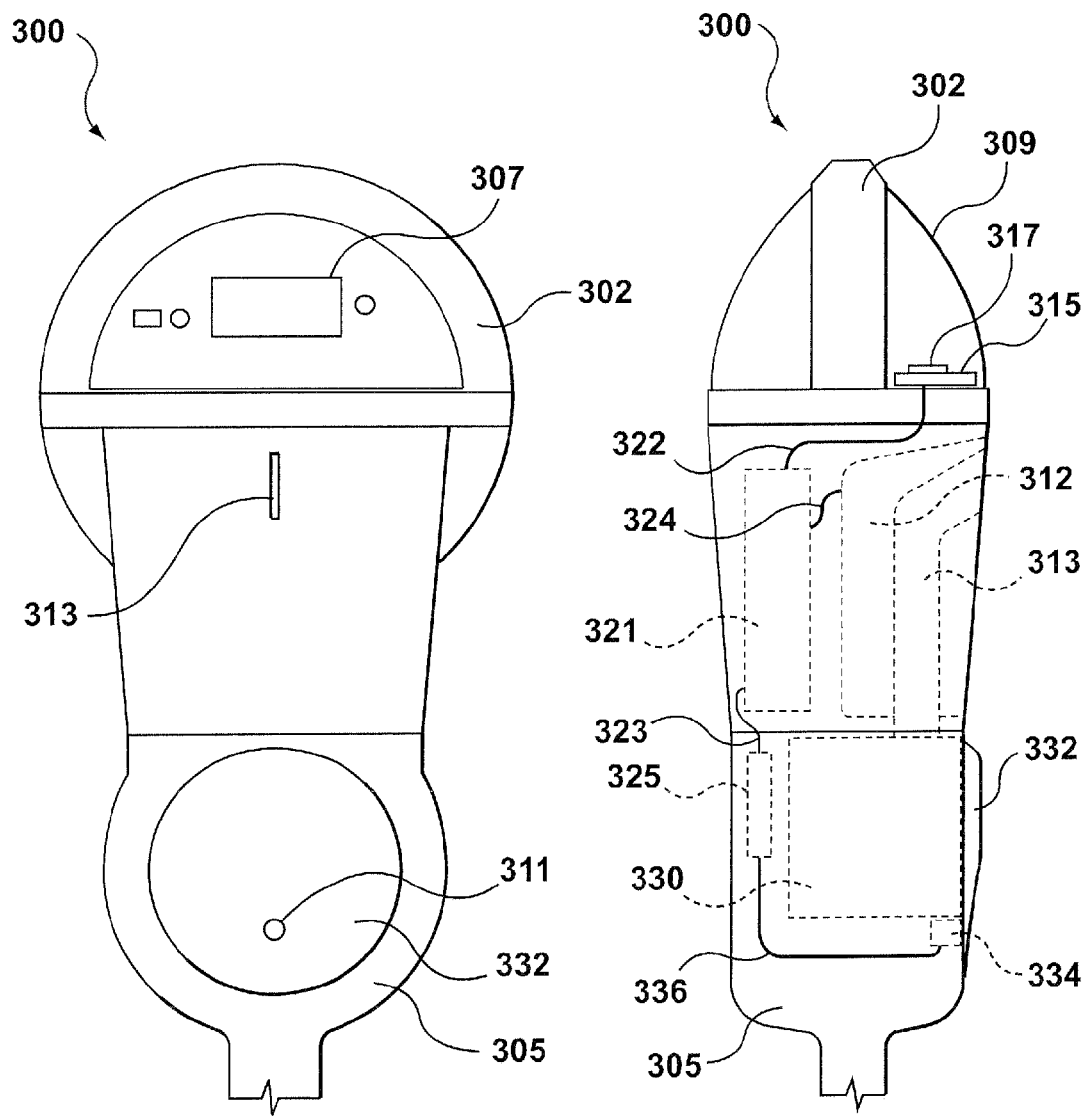
FIG. 3a
FIG. 3b
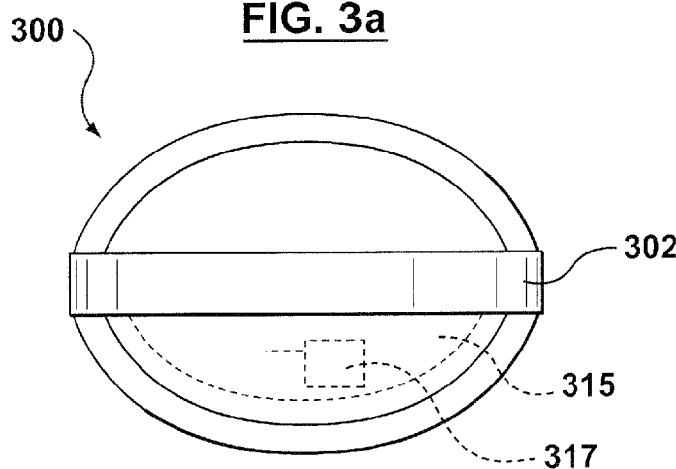
FIG. 3c

DATA COLLECTION SYSTEM FOR ELECTRONIC PARKING METERS

CROSS REFERENCE TO RELATED APPLICATION

This application claims priority from U.S. Provisional Application Ser. No. 61/048,133, filed Apr. 25, 2008, the contents of which are incorporated herein by reference.

TECHNICAL FIELD

The present disclosure relates generally to parking meters, and more particularly to improved data collection for single space electronic parking meters.

BACKGROUND

Parking meters can be used as a revenue stream as well as for the management and flow of vehicles and traffic in a municipality. However, in order to increase that revenue stream, the parking meters must be managed efficiently. Various parking meters have been developed for improving the efficiencies of parking meters. This has resulted in parking meters storing information relating to the operation of the parking meter, such as fees collected, errors, coin jams, etc. This parking meter information is then collected and analyzed to improve the revenue stream. This may include adding additional parking meters to high use areas, increase the cost of parking in high use areas, etc.

Parking meters may be classified broadly as multi-space parking meters, or single space parking meters. Multi-space parking meters are larger units in which a parking ticket can be purchased and then must be displayed on the vehicle, or the user may enter a parking space number corresponding to a parking spot for which parking is being purchased and pays for their parking. Multi-space meters are typically used to provide parking metering to a group of parking spaces, a portion of or all of a street block, or to a portion of or all of a parking lot. The multi-space units are generally large in size and typically are powered either by a connection to the power grid, or by a battery in combination with a solar panel. This allows the multi-space meters to power peripheral devices, such as cellular radios for communicating parking meter information to a monitoring location.

In single space parking meters, which are a common aspect of the fixed infrastructure in many cities and municipalities, the parking meters may not normally have radios, but they do capture and generate quantities of data which would be beneficial for managers attempting to manage the parking meters or increase the revenue stream generated from the parking meters. Unfortunately, capturing this data from the street is manually labor intensive. To do so a data collector such as a collections officer is typically given a hand-held device such as a portable data terminal (PDT) and sent out to each parking meter which is probed in turn and the data is captured. Each parking meter may take between 10 seconds and 30 seconds to complete the data capture cycle. The probing is typically carried out either via infrared communication between the parking meter and the hand-held device at an approximate distance of 6 inches, or via a physical blade probe that is inserted into the coin slot of the parking meter. Once the parking meter information is downloaded onto the hand-held device, it is returned from the field, and the parking meter data is uploaded to a computer system and the manager can then view and report on the parking meter data. It may be necessary to repeat this data collection cycle each week or so in order for the parking meter system to be effectively managed. Some managers may have the parking meter data collected concurrent with the physical coin collection; however, this can make the coin collections much more time consuming and tedious for the collections officer. In some instances, the collections officer collecting the coins and the data concurrently will either forget to collect the data, or forget to collect the coins. Where a collections officer is sent to collect the parking meter data separately from a collections officer collecting the coins, the collected information may not be as useful. From an auditing/reconciliation standpoint the data is not as useful, as it is more difficult to analyze or reconcile the collected parking meter data in relation to the coins collected when the data and coins are not collected coincidently.

Some single space parking meters may wirelessly communicate parking meter information to a monitoring location using cellular radios. A drawback of using cellular radios in a single space parking meter is the power consumption. Available power in a single space parking meter is considerably less than in a larger multi-space parking meter, which may be connected to the power grid. Also, data communications over a cellular network can become expensive where there are large numbers of parking meters involved, as each parking meter will need a cellular radio and a corresponding account activated under a telecommunication services provider. Also, most commercial data plans are scaled up in price relative to the amount of data that is transmitted and can become expensive when relatively large amounts of data are to be communicated. Additionally, the minimum data plans offered by telecommunication service providers may be excessive relative to the data transmission requirements for some sites.

Other single space parking meters communicate parking meter information wirelessly to a proximal wireless fixed access point, such as a wireless router, located up to several hundred feet away, or one or two city street blocks away. These single space parking meters may use various communication technologies. In addition to cellular radio technology there are also a variety of alternative, low power, low cost wireless radio frequency (RF) based technologies that can be deployed and used in the parking meter and remote access point equipment that can achieve the required transmission distances. Unlike the cellular radios, many of these wireless RF technologies, such as Wi-Fi (802.11), Zigbee radios that adhere to IEEE 802.15.4 wireless standards, as well as many other proprietary license free radio systems, do not require individual radio registration and licensing nor require payment of "airtime" fees. The wireless fixed access point communicates wirelessly with the single space parking meters, and may communicate with a monitoring location and/or the Internet either via cellular radio/modem, or via hard wire connection such as a cable modem. However, some wireless communications, or line of sight technologies, between the single space parking meters and the fixed access point may suffer from less than ideal reliability or power consumption, especially when transmitting over longer distances such as those required for communicating with a fixed access point, as obstacles such as large vehicles and surrounding infrastructure may sometimes block or impede communications paths.

There is therefore a need for an improved data collection system for electronic parking meters, which addresses or mitigates one or more of the defects described above.

SUMMARY OF THE INVENTION

In accordance with an embodiment of the present disclosure, there is provided a parking meter management system comprising a single space parking meter and a mobile access point. The mobile access point comprises a coin collection cart, and a mobile data collection terminal including a wireless radio for communicating with the wireless radio of the single space parking meter.

In accordance with a further embodiment of the present disclosure, there is provided a method of managing single space parking meters comprising the steps of collecting and storing meter information in a single space parking meter, receiving at a main electronics board of the single space parking meter a transmit signal, and transmitting the meter information to a mobile access point using a low powered radio of the single space parking meter.

In accordance with a further embodiment of the present disclosure, there is provided a parking meter comprising a payment mechanism for receiving payment for a parking space, a memory for storing parking meter information including information on the payment received, a transmitter for transmitting information to a receiver and a processor for executing instructions. The executed instructions provide a transmitting unit for transmitting the parking meter information stored in the memory using the transmitter, and a trigger unit for triggering the transmission of the parking meter information when a trigger event that is associated with the receiver being within a transmission range is received.

In accordance with a further embodiment of the present disclosure, there is provided a parking meter management system comprising a parking meter for storing and transmitting parking meter information, a coin collection cart for receiving coins retrieved from a plurality of parking meters including the parking meter, and a receiver for receiving the parking meter information wherein the trigger unit of the parking meter triggers the transmission of the parking meter information when the receiver is within a transmission range.

In accordance with a further embodiment of the present disclosure, there is provided a method of transmitting parking meter information comprising storing parking meter information in a memory of the parking meter, detecting at the parking meter an occurrence of a trigger event indicating that a receiver is within a transmission range of the parking meter, and triggering the transmission of the parking meter information stored in the memory.

BRIEF DESCRIPTION OF THE DRAWINGS

Embodiments of the system and method for managing single space parking meters will now be described by way of example with reference to the following drawings in which:

FIG. 2a depicts a front view of an illustrative type of single space parking meter in accordance with the present disclosure;

FIG. 2b depicts a side view of the single space parking meter of FIG. 2a;

FIG. 2c depicts a top overhead view of the single space parking meter of FIG. 2a;

FIG. 3a depicts a front view of another illustrative type of single space parking meter in accordance with the present disclosure;

FIG. 3b depicts a side view of the single space parking meter of FIG. 3a;

FIG. 3c depicts a top overhead view of the single space parking meter of FIG. 3a;

FIG. 6b depicts in a schematic a hand-held data collection terminal for use in the parking meter management system of FIG. 6a;

FIG. 6c depicts in a schematic a parking meter in accordance with the parking meter management system of FIG. 6a.

DETAILED DESCRIPTION

There is described herein a low power radio board for connecting to a single space parking meter comprising a main electronics board for controlling the single space parking meter, the main electronics board includes a peripheral port for connecting peripherals to. The low power radio board comprises a low power radio electrically connected to a connector to be coupled to the peripheral port of the main electronics board, the low power radio board shaped to fit within a housing of the single space parking meter adjacent an opening in the housing of the single space parking meter. It is noted that the low power radio board does not have to be on a separate board, as it could also be integrated into the main electronics board as an integrated feature.

There is further described herein a single space parking meter comprising an outer housing that includes a vault door. The outer housing encloses a parking meter mechanism comprising a coin chute, a main electronics board, a display located in an opening of the outer housing, and a wireless radio electrically connected to, or integrated into, the main electronics board. The parking meter further comprises a coin vault and a vault door sensor coupled to the main electronics board.

Figure 1:
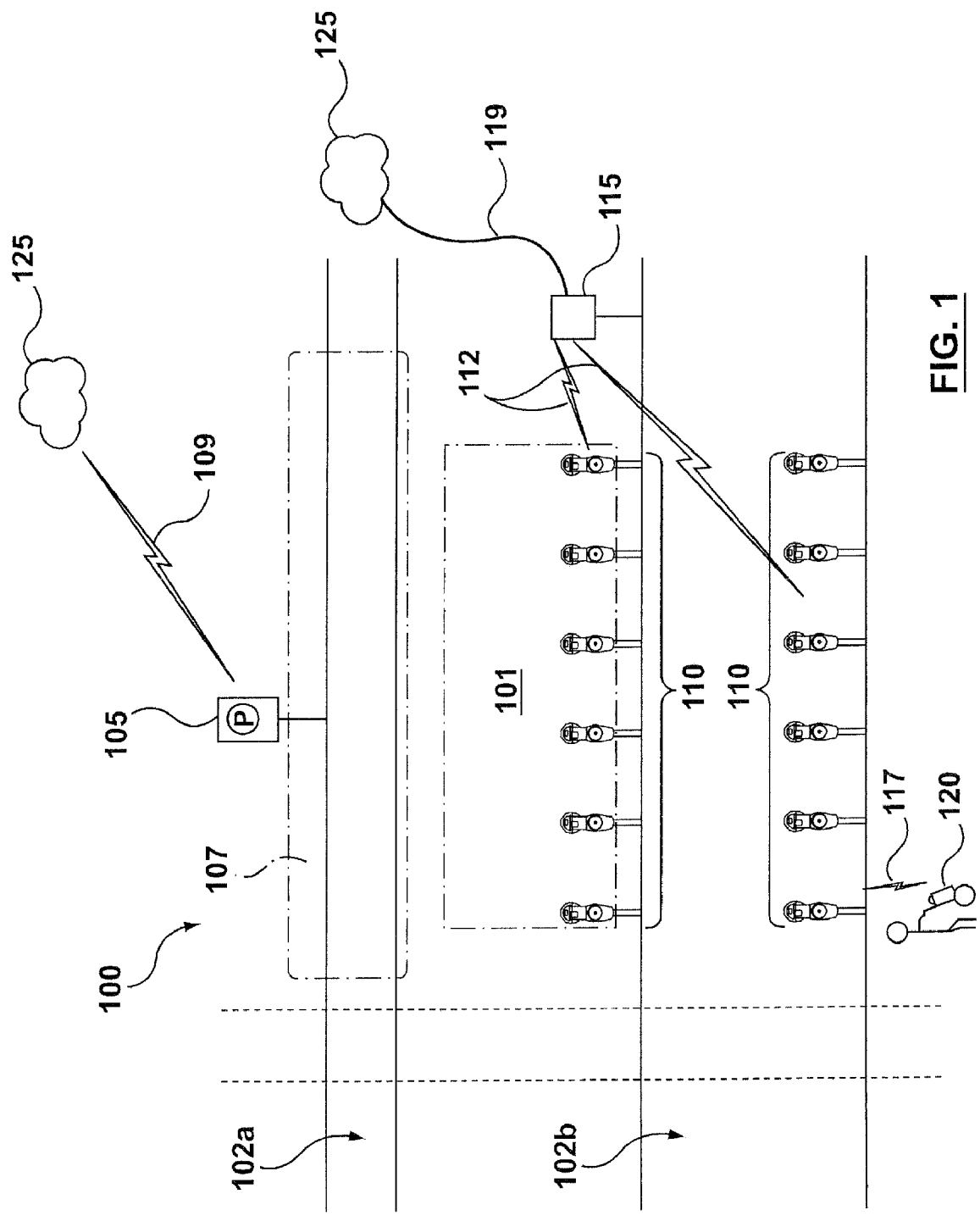
FIG. 1 depicts a schematic of an environment in which embodiments of the present disclosure may be practiced.

FIG. 1 depicts in a schematic an environment 100 in which embodiments of the present disclosure may be practiced. FIG. 1 depicts an illustrative city location in which parking meters are used. The environment 100 comprises a building 101 and a plurality of streets 102a, 102b that use parking meters to enforce parking restrictions. Two types of parking meters are depicted in FIG. 1, multi-space (MS) parking meter 105 and single space meters 110.

The street 102a comprises multiple parking spots in a parking enforcement zone 107 corresponding to the MS parking meter 105. The MS parking meter 105 is a multi-space type meter that is used to purchase a ticket for a parking space of the parking enforcement zone 107, depicted schematically as a rectangle. The parking enforcement zone 107 may comprise multiple parking spots. The MS parking meter 105 may collect and communicate parking meter information by way of a wireless wide area network cellular link, shown schematically as 109. The MS meter is shown as communicating with a network cloud 125. It is understood by those of ordinary skill in the art that the network cloud 125 schematically represents communicating the parking meter information back to a monitoring location (not shown) using a network or networks. For example, the MS parking meter 105 may communicate with the monitoring location by connecting to the Internet using a cellular network. The connection to the Internet may allow the MS parking meter 105 to upload parking meter information to the monitoring location, which may include a computer system or server. The uploaded parking meter information may then be displayed on a web site or through other applications that can connect to the computer system or server to access the parking meter information.

The street 102b comprises multiple parking spots each with an associated parking meter 110. Parking meters 110 are each individual single space parking meters which each may comprise a low power radio configuration as described further herein. The single space parking meters 110 may also collect and communicate parking meter information to the monitoring location. However, the single space meters are each provided with low power radios not cellular radios, and so are not able to communicate in the same manner as described above for the MS meters 105. As shown schematically by 112, the single space meters 110 may communicate with a fixed access point 115. Additionally or alternatively the single space meters 110 may communicate with a mobile access point 120, as depicted by 117.

The fixed access point 115 provides a gateway between the single space meters 110 and the network cloud 125 to provide communication between the single space meters and the monitoring location. The fixed access point 115 may be powered in a similar manner as the MS parking meter 105. The fixed access point 115 comprises a radio (or multiple radios) for communicating with the low powered radios of the single space meters 110. The fixed access point 115 also comprises a wide area radio transceiver for communicating with the network cloud 125. The transceiver may be a wired or wireless connection as depicted by 119.

The mobile access point 120 also provides a gateway between the single space meters 110 and the monitoring location. The mobile access point 120 may comprise a hand-held device, or other terminal device, with a radio for communicating with the low powered radios of the single space meters 110. The information may be transferred to the monitoring location by various methods. For example, the hand-held device of the mobile access point 120 may comprise an additional wide area radio transceiver for communicating with the monitoring location through the network cloud 125. The additional radio may provide access to the Internet through a cellular network or other WWAN. Additionally or alternatively the hand-held device of the mobile access point 120 may connect to the monitoring location by a cradle or other type of wired connection, or alternatively it may communicate with the monitoring location when the mobile access point 120 is near the monitoring location using the radio normally used to communicate with the low powered radio of the single space meters 110. Such radio communication between the mobile access point 120 and the monitoring location may be effected using Wi-Fi (802.11a/b/g/n), Zigbee or other similar protocols.

The single space parking meters 110 may communicate with both the fixed access point 115 and the mobile access point 120. The communication between the access points 115, 120, single space parking meters 110 and the monitoring location may provide communication for a parking meter system. The parking meter system may also include the MS parking meter 105.

It is understood that various methods of communicating the parking meter information between the access points 115, 120 and the monitoring location are possible and within the scope of the present disclosure. Additionally, it is understood that the monitoring location referred to above may comprise a computer or plurality of computers that provide functionality to parking enforcement managers for auditing and managing the parking meters. The computer or computers of the monitoring location may utilize Web-based applications to perform such auditing and managing. It is understood that the computer or plurality of computers each comprise a memory for storing instructions and at least one processor for executing the instructions stored in the memory. The instructions stored in the memory, when executed by the processor or processors, may provide the functionality or parts of the functionality used by parking enforcement managers or others. Additionally, if the single space meters 110 are provided with the ability for receiving information from the monitoring location, the software of the computers or servers of the monitoring location may be used to provide functionality for setting or adjusting single space meter 110 control settings, such as for example the pay rate for the single space meter 110.

FIGS. 2a, 2b and 2c depict an illustrative embodiment of a single space meter 200 configured with a low powered radio. The single space meter 200 may be used as one or more of the single space parking meters 110 in the environment 100. The single space meter 200 may comprise an outer housing assembly that may have an upper housing 202 and a lower housing 205. The outer housing may enclose a single space meter mechanism. The single space meter mechanism fits into the outer housing assembly that includes the upper housing 202 and the lower housing 205. The single space meter mechanism may comprise a display 207 such as a seven segment display or a liquid crystal display (LCD) for displaying parking messages including the amount of parking time remaining. A low powered radio 217 which is located on a radio board 215 which may be fixed to the single space meter mechanism, or alternatively housed within either the upper 202 or lower 205 housing or possibly in a separate housing fixed to the outer housing (not shown). The low powered radio 217 is electrically coupled to main board electronics 220 of the single space meter mechanism. The coupling may be made by, for example a cable connection 222 between the main board electronics 220 and the radio board 215. The low power radio board 215 may also be alternatively integrated into the main board electronics 220 thereby foregoing the requirements of a connection 222 and associated wiring. An opening in the upper housing 202 through which the display 207 is visible is covered with a rugged see through material such as Lexan® or other similar material 209.

The outer housing comprising the upper and lower 202, 205 of the single space meter 200 encloses the main board electronics 220 which may form part of the single space meter mechanism. The outer housing may also house a coin slot 213 for purchasing parking time on the single space meter. All coins deposited into the parking meter through the coin slot 213 eventually end up in a coin canister located in the lower housing 205 of the parking meter 200. The coin canister may also be referred to as a coin vault or simply a vault. The vault is typically accessed by an opening in the lower housing, such as a vault door, which may be locked with a lock 211.

The main board electronics 220 of the single space parking meter 200 control the operation of the single space meter 200. The main board electronics 220 may comprise for example a processor and memory for storing operating instructions. The operating instructions may be executed by the processor in order to perform the required functions of the single space meter 200. These functions may include storing the parking meter information and transmitting the parking meter information to the access points 115, 120. They may also control the amount of power used by the low powered radio to transmit to the access points 115, 120 in dependence upon whether the parking meter is configured to communicate with the fixed access point which may be located at a fixed, pre-determined distance or with the mobile access point, which is typically located in the vicinity of, or close proximity to, the parking meter during transmission of the parking meter information. The parking meter information may include information regarding the amount of money collected by the parking meter, as well as other information useful for auditing and managing the parking enforcement plan. The parking meter information may also include diagnostic information for diagnosing or analyzing the state of the single space meter 200.

The following is a non-exhaustive list of parking meter information that may be collected, stored and possibly transmitted by the low powered radio 217 from the parking meter 200 to the access points 115, 120:

- total coin count for different denominations of coins received by the parking meter;
- total count for cashless payments made at the parking meter using for example chip cards, electronic purses or credit cards;
- last collection date indicating the previous date that coins were removed from the parking meter and/or the previous date that parking meter information was collected from the parking meter;
- current collection date stored when coins are collected and/or parking meter information is collected from the parking meter;
- purchase times indicating the dates/times when parking was paid for; and the amount paid;
- operating time indicating the amount of time the processor or main board electronics were in the operating mode and/or in a sleep mode;
- self diagnostic tests results indicating the results of self diagnostic tests run by the parking meter;
- time and durations of any errors or malfunctions encountered by the parking meter; and
- state of the vault door, for example open, closed and/or locked.

In addition to controlling the single space parking meter 200, the instructions stored in memory and executed by the processor or main board electronics 220 may be used when the single space parking meter 200 transmits the collected parking meter information to the mobile access point 120 or the fixed access point 115. The functionality provided by the instructions executed by the processor can be configured to transmit the parking meter information on the occurrence of various trigger events. The transmit trigger events may differ depending on the type of access point the single space parking meter 200 is communicating with, which can be set as a parameter or value of the processor instructions. For example, if the processor or main board electronics 220 is configured to communicate with the fixed access point 115, the transmitting trigger event may be a periodically scheduled event provided by the processor executing the instructions. The processor may be configured to transmit the parking meter information at scheduled times over the day, such as four times periodically throughout the day. Periodically sending the parking meter information throughout the day may lead to a reduction in the amount of memory required on the parking meter 200, which can reduce the amount of power consumed by the single space parking meter 200. The single space parking meter 200 may also transmit at non-scheduled times, coincident with operational events affecting the serviceability of the single space meter 220. These trigger events may include parking meter 200 events such as a jammed meter, low battery condition, or other out of service conditions that requires attention by service or maintenance workers. This helps ensure that managers are made aware of service issues of parking meters as they happen. This information may be used to coordinate the activities of the maintenance and service staff, and ensure that the parking meters 200 of the parking meter management system is kept at a high operational performance. During times when the parking meter 200 is not transmitting parking meter information, the low powered radio 217 and radio board 215 may be turned off under the control of the processor, thus further reducing the amount of power consumed by the low powered radio 217 and the single space meter 200.

The parking meter 200 or its processor may also be configured to transmit the parking meter information to the mobile access point 120. When transmitting the parking meter information to the mobile access point, or a receiver of the mobile access point 120, the transmit trigger event may be associated with an event that occurs when the receiver or mobile access point 120 is in close proximity to the parking meter. This trigger event may include a signal provided to the parking meter associated with the mobile access point 120 being within range. Although different signals are possible, a convenient signal may be provided by including a switch connected to the processor or main board electronics 220. The switch may generate the transmit signal to the processor when the vault door in the lower housing 205 is opened to remove the coins. Advantageously, this allows the parking meter information to be collected when collecting coins from the parking meter 200 without requiring additional effort such as the use of a probe. The trigger event may be associated with the mobile access point being in the same vicinity of, or close proximity to, the parking meter since the mobile access point may be carried by a collections officer, maintenance staff, or on the coin collection cart which will place it in close proximity when the vault door is opened in order to transfer the coins to the coin collection cart or for performing maintenance.

A collections officer or person typically uses a coin collection cart. The mobile access point 120 can be provided on the coin collection cart. In this manner when the collections officer unlocks and opens the vault door of the single space meter 200 to remove the coins and transfer them to the coin collection cart, the switch will provide the transmit signal as the trigger event which triggers the transmission of the parking meter information. The low powered radio 217 may transmit the parking meter information to the mobile access point 120 located on the coin collection cart. The time required to transmit the parking meter information may be as long as 30 seconds. A typical transmission time may be between 3-6 seconds. The actual transmission time depends on the amount and type of data required to send or receive. As such if there is no parking meter information to transmit or very little parking meter information, the time required to transmit may be less than a second. The coin collection cart may be in close proximity to the parking meter 200, such as for example within 15 feet, or as little as a foot. Since the receiver is typically in close proximity to the transmitter during transmission of the parking meter data, the parking meter information may be transmitted using less power.

If the single space meter 200 is configured to transmit the information on a transmit trigger event, the low powered radio 217 may be off except when it is required to transmit the parking meter information. Advantageously, this further reduces the amount of power consumed by the low powered radio 217 and the single space meter 200.

The single space parking meter 200 may record any vault door opening or other such events even if the mobile access point 120 cannot be contacted when such a trigger event occurs. In this fashion should unauthorized openings of the vault door be taking place they may still be captured and recorded in the memory of the parking meter or its main board electronics 220 for transmission at the next opportunity that the mobile access point 120 is contacted. Additionally or alternatively the parking meter 200 may communicate to the fixed access point 115 that a vault open event has occurred while no mobile access point 120 was within transmission range. Although the vault door switch provides a simple transmit trigger event, it is possible to use different means to generate the transmit trigger event. For example, the transmit trigger event could be generated based on an IR receiver, a fingerprint reader, a radio frequency identification (RFID) tag or tag reader. Each of these means could be activated when a collections officer is collecting coins, or a maintenance staff is performing maintenance, and so by associated with the receiver, which may be carried by the collections officer, coin collection cart or maintenance staff, being in close proximity to the transmitter. The means to generate the transmit trigger event may require consideration of power use. For example using a fingerprint reader may be desirable in some situations, even if the fingerprint reader requires a small amount of power to operate.

The upper housing 202 and the lower housing 205 of the single space meter 200 are typically constructed out of metal due to the ruggedness required. A low powered radio located within the metal of the housing may have difficulty in communicating with an access point 115, 120. Advantageously, the low powered radio 217, and the radio board are located adjacent to a lower edge of the opening in the upper housing 202. As outlined above, this opening is covered by a rugged see through material such as Lexan® 209. By positioning the low powered radio 217 adjacent this opening 209, it is possible to maintain the low power characteristics of the low powered radio 217, as the radio waves will radiate easily through the see through material of the opening 209.

The above description relates to low powered radios connected to main board electronics that control a parking meter. It is understood that arrangements other than those outlined above are possible. For example the low power radio could be included as part of the main board electronics enclosed within the lower housing. In such an arrangement it may be advantageous to provide a Lexan® cut-out, or other such material that is transparent to radio waves of the low power radio, in the housing adjacent the radio. Alternatively the radio antenna and/or circuit board may be located in place of or in lieu of the traditional infrared receiver/transmitter components found on many electronic parking meter main boards which are also typically mounted behind the clear Lexan® material. Depending on the required ruggedness and life expectancy of the single space meter the Lexan® covering (either of the display opening or separate radio cut-out) may not be formed as part of the meter. This can advantageously allow for the covering or cut-out to be replaced in the field.

FIGS. 3a, 3b, and 3c depict in schematics another illustrative embodiment of a single space parking meter 300. The single space parking meter 300 is similar to that described above with respect to single space meter 200, and may be used as one or more of the parking meters 110 of the environment 100. The single space parking meter 300 comprises an upper housing 302 and lower housing 305 that form an outer housing. The outer housing encloses a single space meter mechanism that comprises metering mechanicals and electronics, as well as a meter display 307 and the low power radio 317 on the radio board 315. The metering mechanicals may include a coin chute component 312 for determining the coinage inserted into the single space meter 300. The coin chute component 312 comprises a coin chute 313 connecting the exterior of the parking meter 300 with a coin vault 330 housed in the lower housing 305 of the single space parking meter 300. The lower housing 305 includes a vault door 332 that includes a lock 311. The lock 311 may be electrical, or as is typically found, a mechanical lock. The lower housing 305 may include a vault door switch 334 for determining when the vault door 332 is opened. The vault door switch 334 may provide a signal of a transmit trigger event to the processor when the vault door 332 is opened to remove the deposited coins from the coin vault 330 and transfer them to a coin collection cart. It is understood that the vault door switch 334 may be any type of sensor that can be deployed to detect the open/closed/locked state of the vault door and signal the vault door state to the processor. Preferably the vault door switch or sensor 334 should be able to detect when the vault door is closed as well as locked.

The vault door switch 334 may be electrically connected via interconnect 336 to a memory module 325 that may be located in the lower housing 305. The memory module 325 may store parking meter configuration information, as well as the physical meter location ID. The memory module 325 may store information such as current meter rate profile or other required zone information. The memory module 325 may be connected to the main electronics board 321 for example by interconnect 323. The coin chute component 312 may also be connected to the main electronics board 321 by interconnect 324. The main electronics board 321 is also connected to the radio board 315 for controlling the low powered radio 317 by interconnect 322. The main electronics board 321 comprises a processor for executing single space meter 300 control programs stored in memory of the main electronics board.

The main electronics board 321 may be provided with sufficient peripheral ports for connecting the main electronics board 321 with multiple components including, for example, the coin chute component 312, the memory module 325, the vault switch 334, which may be connected to the memory module 325 and the radio board 315. If the main electronics board 321 is provided with sufficient connection ports, the radio board 315 can be simply added as a peripheral by including it within the upper housing 302, and updating the single space meter 300 control software to include the meter information transmitting functionality, which may include transmit trigger event control software. Alternatively multiple components may share a connection to a single peripheral port connection to the main electronics board 321.

The radio board 315 and low powered radio 317 may also be added onto a single space meter 300 that has a main electronics board 321 that does not have a peripheral port for attaching the radio board 315. In this case the radio board may be designed to be connected between the memory module and the main electronics board. The radio board may then simply pass the memory module connection through to the main electronics board. The single space meter 300 control software would be updated to provide the additional functionality possible through the use of the radio board 315.

The processor of the parking meter 300 may execute instructions to provide the parking meter 300 with a transmitting unit for transmitting the parking meter information to the receiver using the low powered radio 317. The low powered radio 317 may include a transmitter for transmitting data to a receiver. The low powered radio 317 may also comprise a receiver for receiving data. It is understood that both the transmitter and receiver may be provided by a transceiver.

The executed instructions may also provide the parking meter 300 with a trigger unit for triggering the transmission of the parking meter information using the transmitting unit. The trigger unit may trigger the transmission of the parking meter information when a trigger event associated with the receiver being within a transmission range is received by the triggering unit.

In a further alternative embodiment, the radio board may comprise the memory module and so connect to the memory module port on the main electronics board or an available peripheral port of the main electronics board. A possible disadvantage with this arrangement is that if the upper housing is replaced in the field (for example due to a jammed coin chute) it may be necessary to reprogram the single space parking meter parameters such as for example the parking meter rate profile. This is because the memory module that stores the parameters is part of the radio board that is located in the upper housing 302 that is removed and not the components of the parking meter that are located in the lower housing and are not removed. This disadvantage can be mitigated or overcome by providing the low powered radio 317 and processor with receiving functionality so that it may receive and store the parking meter parameters from the access point 115, 120, which in turn can be provided by from the monitoring location.

FIGS. 4a, 4b, 4c and 4d depict in schematics an illustrative embodiment of a parking meter mechanism 400 that can be housed in the upper housing of a single space parking meter such as for example parking meter 300. The parking meter mechanism 400 comprises a mechanism housing 402, with a display 404 in an opening in the mechanism housing 402. The mechanism housing 402 may further house or support a radio board 410 including a low powered radio 412. The radio board 410 is connected to a peripheral port 416 of a main electronics board 425 by interconnect 414. The interconnect 414 is shown disconnected from the peripheral port 416 in FIG. 4a and connected to the peripheral port 416 in FIG. 4b. The mechanism housing 402 further houses a coin chute 420 such as that described in U.S. Pat. No. 6,227,343 currently owned by J. J. MacKay, and a smart card reader 422 for the purchase of parking time using smart cards, electronic purses or credit cards. The parking meter 400 comprises two payment mechanisms, namely the smart card reader 422 and the coin chute 420. The parking meter 400 may have only a single payment mechanism, or may include different payment mechanisms such as a bill reader.

Figure 4A:
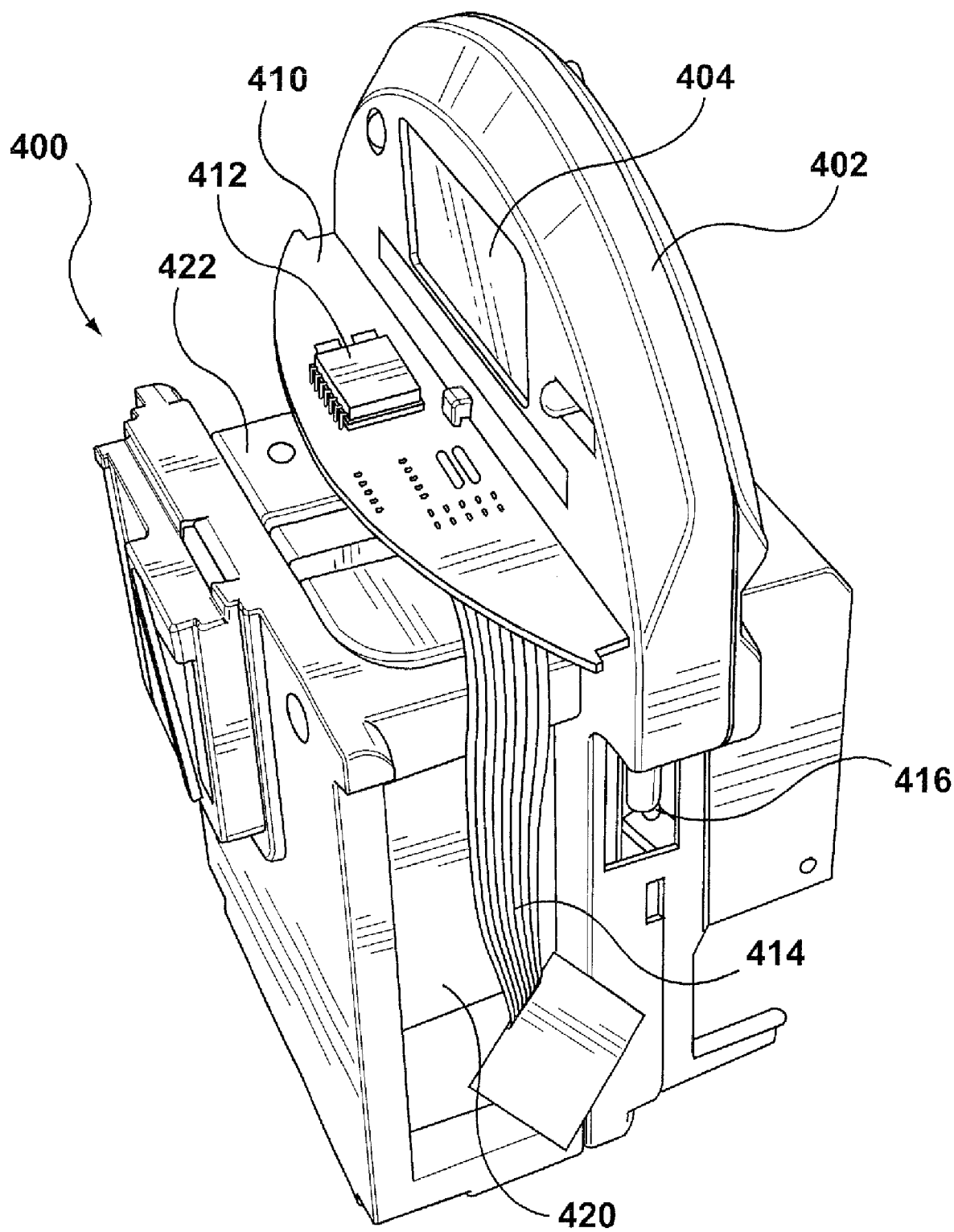
FIG. 4a depicts a perspective schematic of an illustrative meter mechanism in accordance with the present disclosure having an interconnect disconnected to a peripheral port.
Figure 4B:
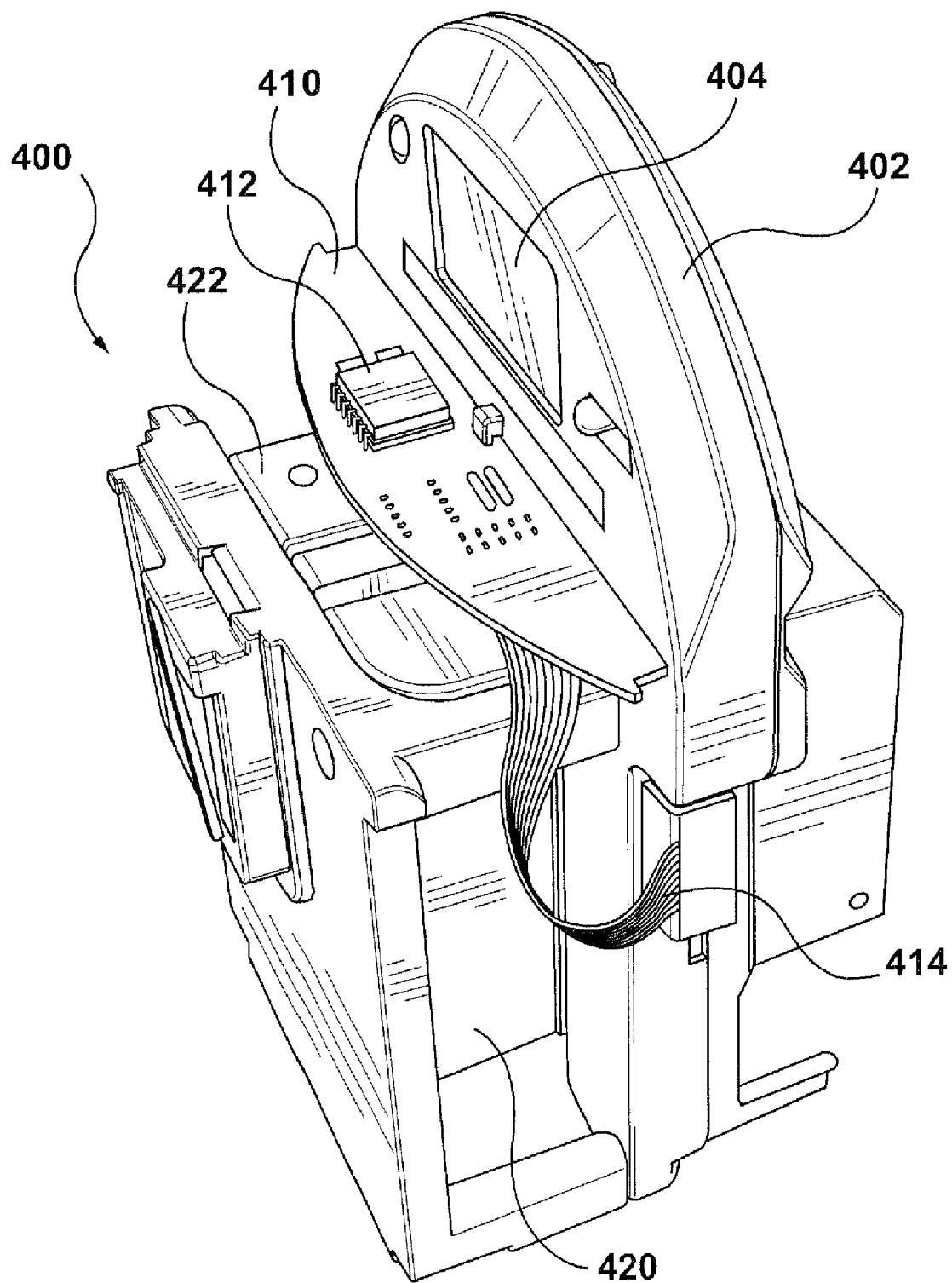
FIG. 4b depicts a perspective schematic of the meter mechanism of FIG. 4a in accordance with the present disclosure having an interconnect connected to a peripheral port.
Figure 4C:
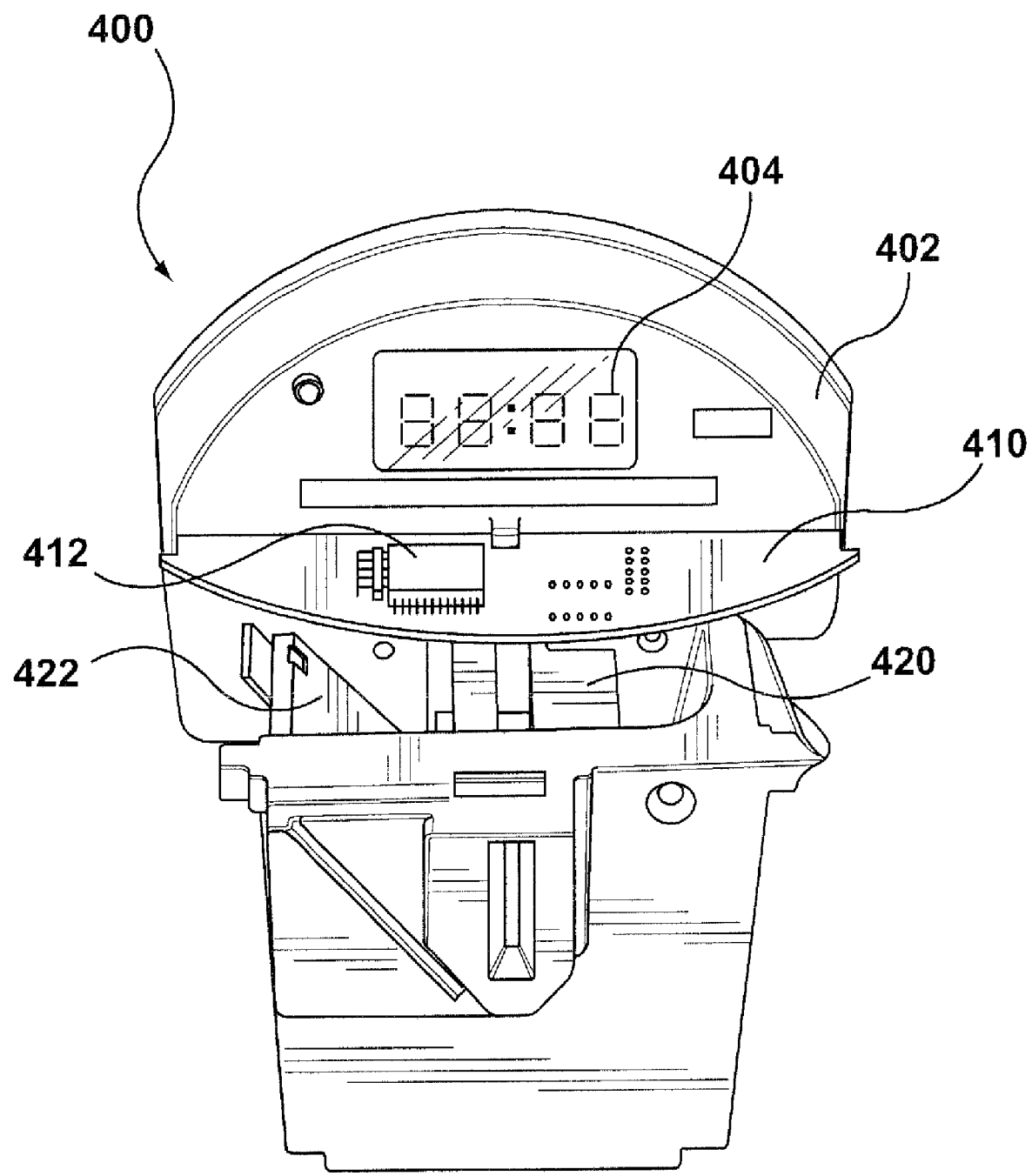
FIG. 4c depicts a front view schematic of the meter mechanism of FIG. 4a in accordance with the present disclosure.
Figure 4D:
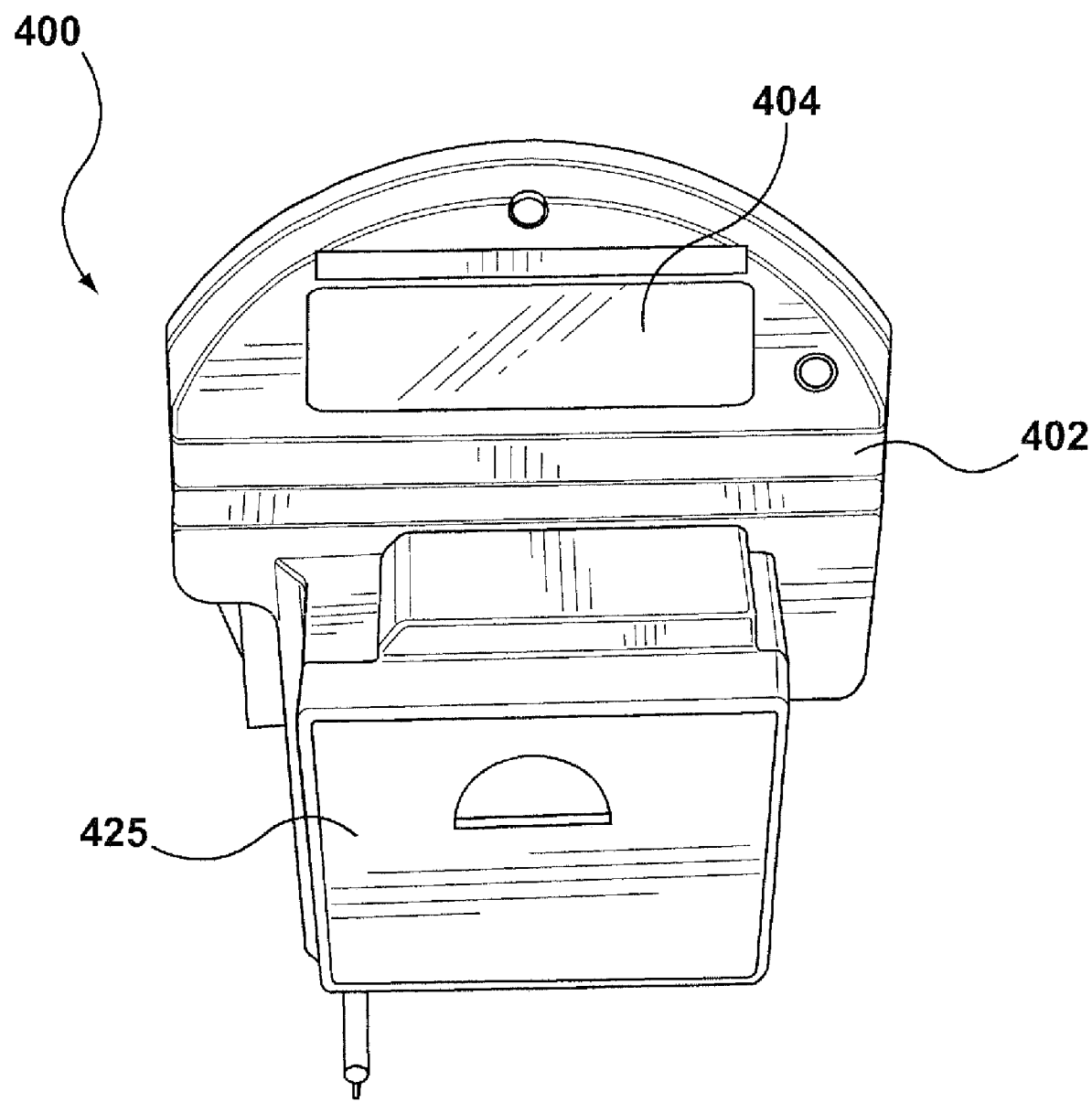
FIG. 4d depicts a rear view schematic of the meter mechanism of FIG. 4a in accordance with the present disclosure.
Figure 5A:
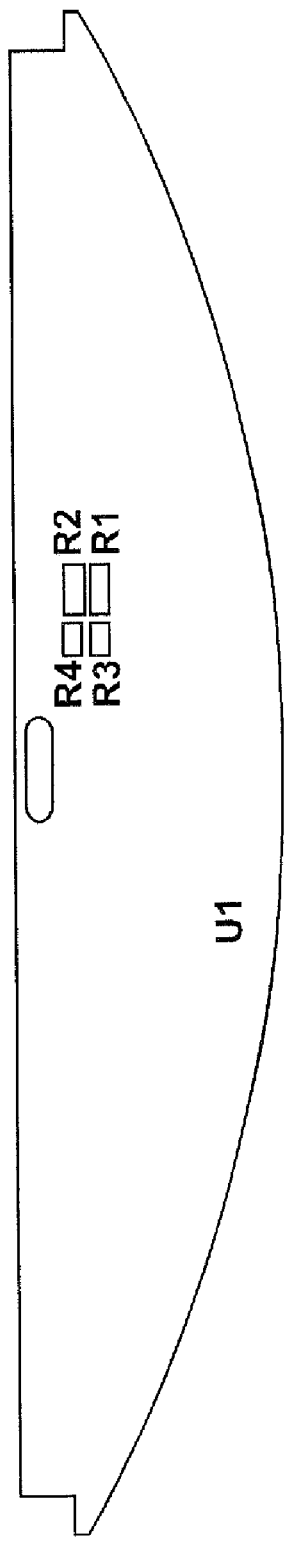
FIG. 5a depicts a top view of an illustrative radio board in accordance with the present disclosure.
Figure 5B:
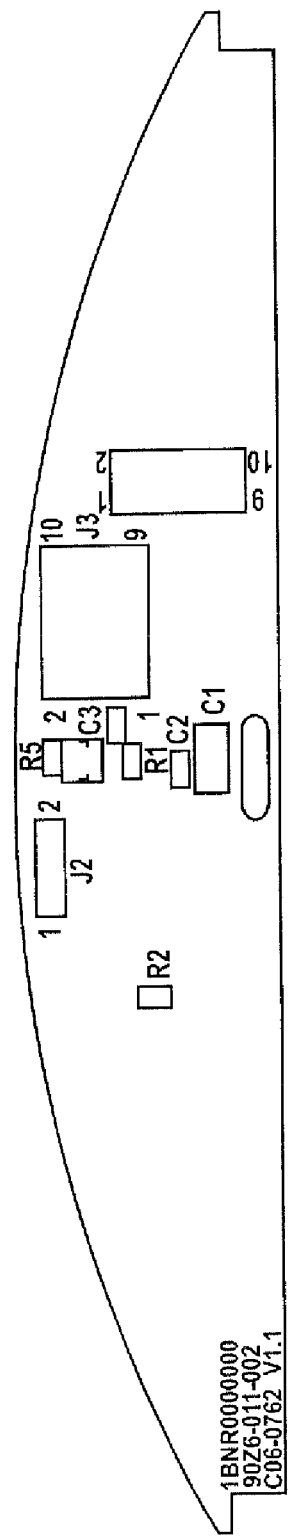
FIG. 5b depicts a bottom view of the radio board of FIG. 5a in accordance with the present disclosure.

FIGS. 5a and 5b depict the layout of components for an illustrative radio board, such as radio board 410 of FIGS. 4a-4c. The components of the illustrative radio board are set forth in the table below.

Additional components may be installed on the radio board in order to facilitate testing and debugging. These components may include:

| Reference | Part Description | Manufacturer P/N's |
| --- | --- | --- |
| D1 | Led Thin 565 nm Grn Diff 0805 SMD | Lumex SML-LXT0805GW-TR |
| D2 | Led Thin 635 nm Red Diff 0805 SMD | Lumex SML-LXT0805IW-TR |
| J2 | Header Pins (Generic) | Common source |
| J3 | Conn Recept 10pos .100 Rt/A Dual | AMP 6-5535512-4 |
| R3, R4 | Resistor, thick film, 330 Ohm 1/10 w 5% 0603 SMD | Rohm MCR03EZPJ331 |

Figure 6A:
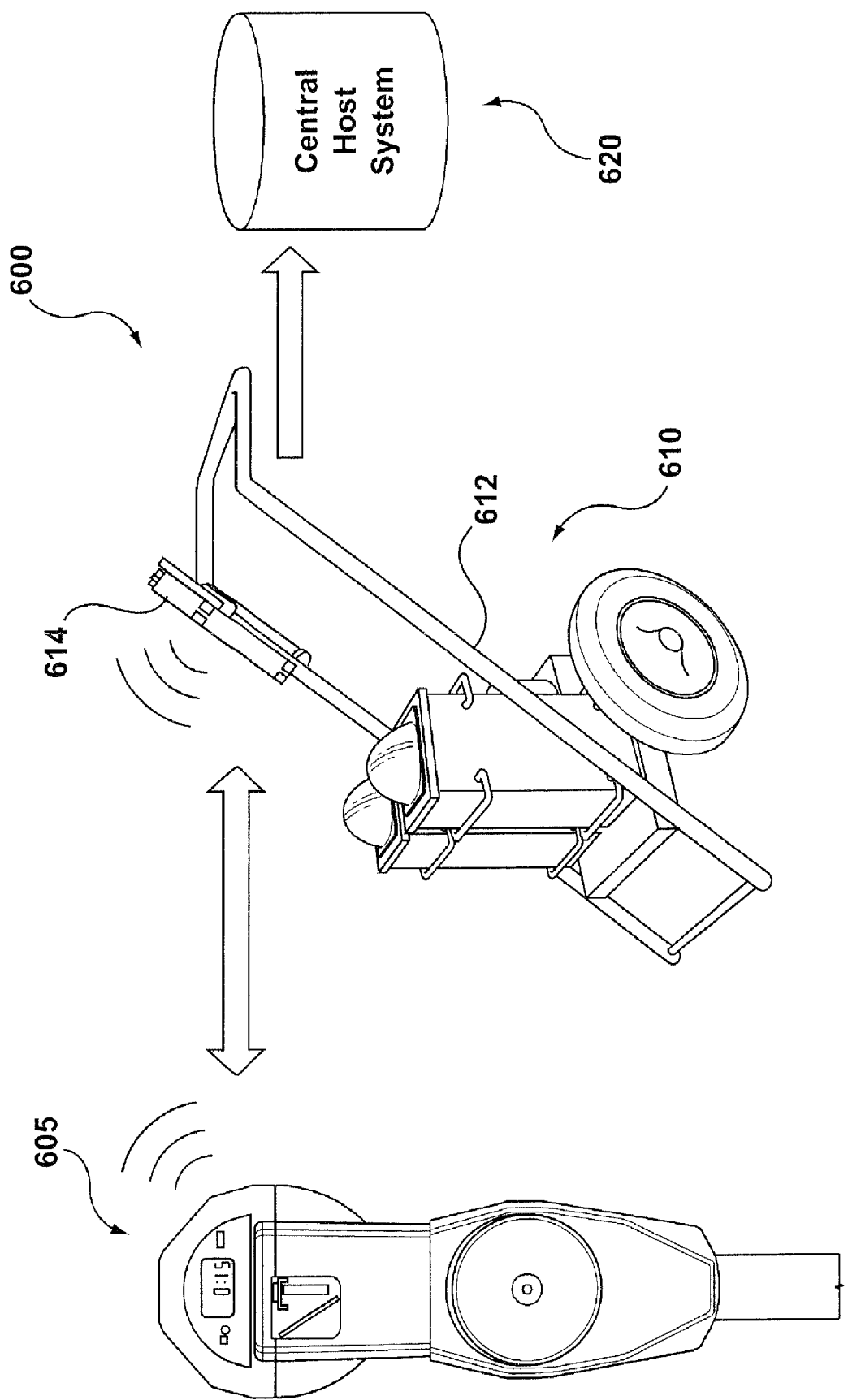
FIG. 6a depicts a schematic of a parking meter management system in accordance with the present disclosure.

FIG. 6a depicts in a schematic an illustrative parking meter management system in accordance with the present disclosure. The parking meter management system 600 comprises at least one single space parking meter 605 in accordance with one of the illustrative embodiments described above. Although only one parking meter 605 is depicted it is understood that the parking meter management system 600 may comprise any number of parking meters in accordance with the present disclosure. The parking meter management system 600 further comprises a mobile access point 610 which comprises a coin collection cart 612 and a data collection terminal 614 which may be a hand held terminal having a receiver for receiving the parking meter transmitted by a transmitter of the parking meter 605. The parking meter management system 600 may further comprise a parking management and reporting central host system 620, which may include parking meter management software for reporting and managing the meter information retrieved from the single space meters. The parking management and reporting central host system may be located on one or more computers comprising processors executing instructions stored in memory that provide the parking management and reporting functionality.

A collection officer would generally push or pull the coin collection cart 610 to each single space parking 605 of the parking meter system 600. The collection officer opens the vault door and removes the coins from the parking meter 605 and transfers them to the coin collection cart 610. If the parking meter 605 uses a vault switch to provide a signal for initiating transmission of the parking meter information then the parking meter begins transferring the parking meter information to the coin collection cart which the collection officer has brought in close proximity to the meter in order to transfer

| Reference | Part Description | Manufacturer P/N's |
| --- | --- | --- |
| PCB1 | Guardian X SmartCollection Module V1.1 PCB Gerbers | MacKay # S026-011-002 |
| C1 | Digital Noise Filter 81 MHz SMD | Panasonic ELK-E221FA |
| C2 | Capacitor Ceramic 1.0uF 16 V X5R 0603 | Kemet C0603C105K4PACTU |
| C3 | Capacitor 0.1uF 25 V Ceramic Y5V 0603 | Kemet C0603C104Z3VACTU |
| J1 | Cable Assembly, Dip-To-Ribbon, 10-Pos | Digi-Key A2MXS-1006G-ND |
| R1 | Resistor, thick film, 100k Ohm 1/10 w 5% 0603 SMD | Rohm MCR03EZPJ104 |
| R2 | Resistor, thick film, 0.0 Ohm 1/10 w 5% 0603 SMD | Rohm MCR03EZPJ000 |
| R5 | Resistor, thick film, 1.0 m Ohm 1/10 w 5% 0603 SMD | Rohm MCR03EZPJ105 |
| U1 | Module 802.15.4/Zigbit 2.4 ghz Chipant | Meshnetics ZDM-A1281-A2 |
| U3 | IC Single Buffer/Driver open drain SOT23-5 | TI SN74AUP1G07DBVR |
| A1 | Connector, Cardedge 10pin Gold Without Ear | CW Industries CWR-170-10-0000 |
| A2 | Polarizing Key (Card Edge) | CW Industries CWN-KEY 2 | the coins. When the collection officer opens the vault door to transfer the coins, the vault switch sends a signal to the processor. The signal may be used as a trigger event for triggering the transmission of the parking meter information to the receiver of the terminal 614. If the parking meter 605 uses another means as the trigger event associated with the parking meter being within a transmission range of the receiver, then the signal will similarly be provided to initiate the transmission of the parking meter information when the coin collection cart or the receiver of the collection terminal is within the transmission range. The transmission of the parking meter information from the parking meter to the mobile access point 610, comprising the coin collection cart and a receiver, may require less power as a result of the close proximity of the receiver in the terminal 614 on the collection cart 612 to the parking meter 605. The time required by the collection officer to open the vault door, remove the coins from the vault, transfer the coins to the collection cart and close/lock the vault door is typically longer than the time required to transmit the parking meter information to the mobile access point. As such, the collection officer does not need to alter their coin collection routine.

The parking meter may be provided with a transmission status indicator for indicating that the transmission of the parking meter information is complete. The transmission status indicator may include for example, an audible indicator such as a tone or series of tones, or a visual indicator such as a light emitting diode or other indicator.

Figure 6B:
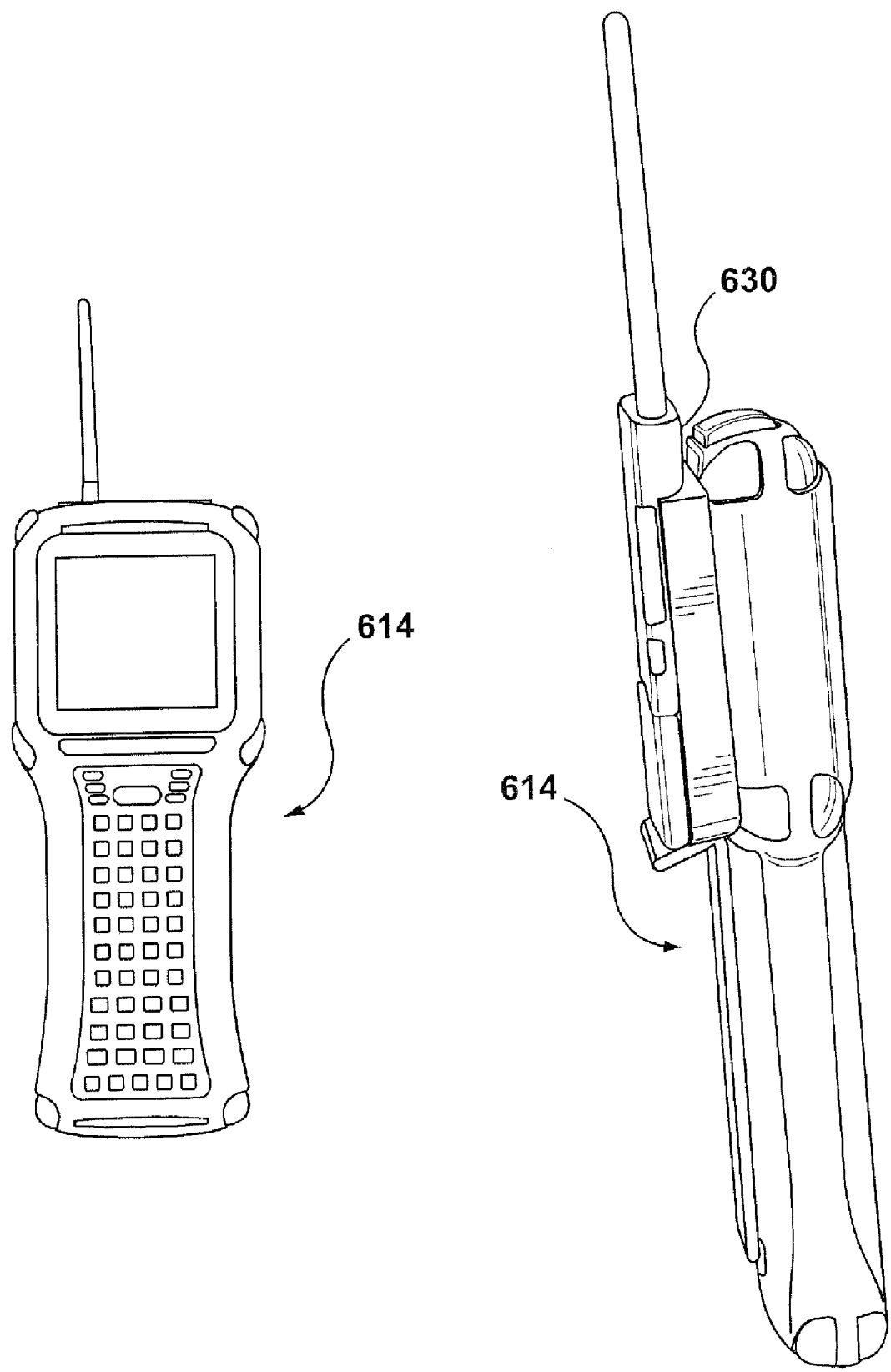

FIG. 6b depicts in a schematic an illustrative hand-held data collection terminal 614 that may be used in the parking meter system 600 of FIG. 6a. The hand-held terminal 614 may include a peripheral radio 630 which may include a receiver for communicating with the transmitters of the low powered radios of the parking meters. The terminal 614 depicted is a Jett-XL® hand-held computer made by Two Technologies, Inc. Other types of terminals can be used if they include a radio for communicating with the low powered radios or transmitters of the parking meters.

The mobile access point 610 may comprise the hand-held terminal 614. As depicted in FIG. 6a, the hand-held terminal 614 may be affixed or coupled to the coin collection cart 612. Alternatively, the mobile access point 610 comprising the hand-held terminal 614 may be carried by the collection officer pushing/pulling a collection cart 612.

Figure 6C:
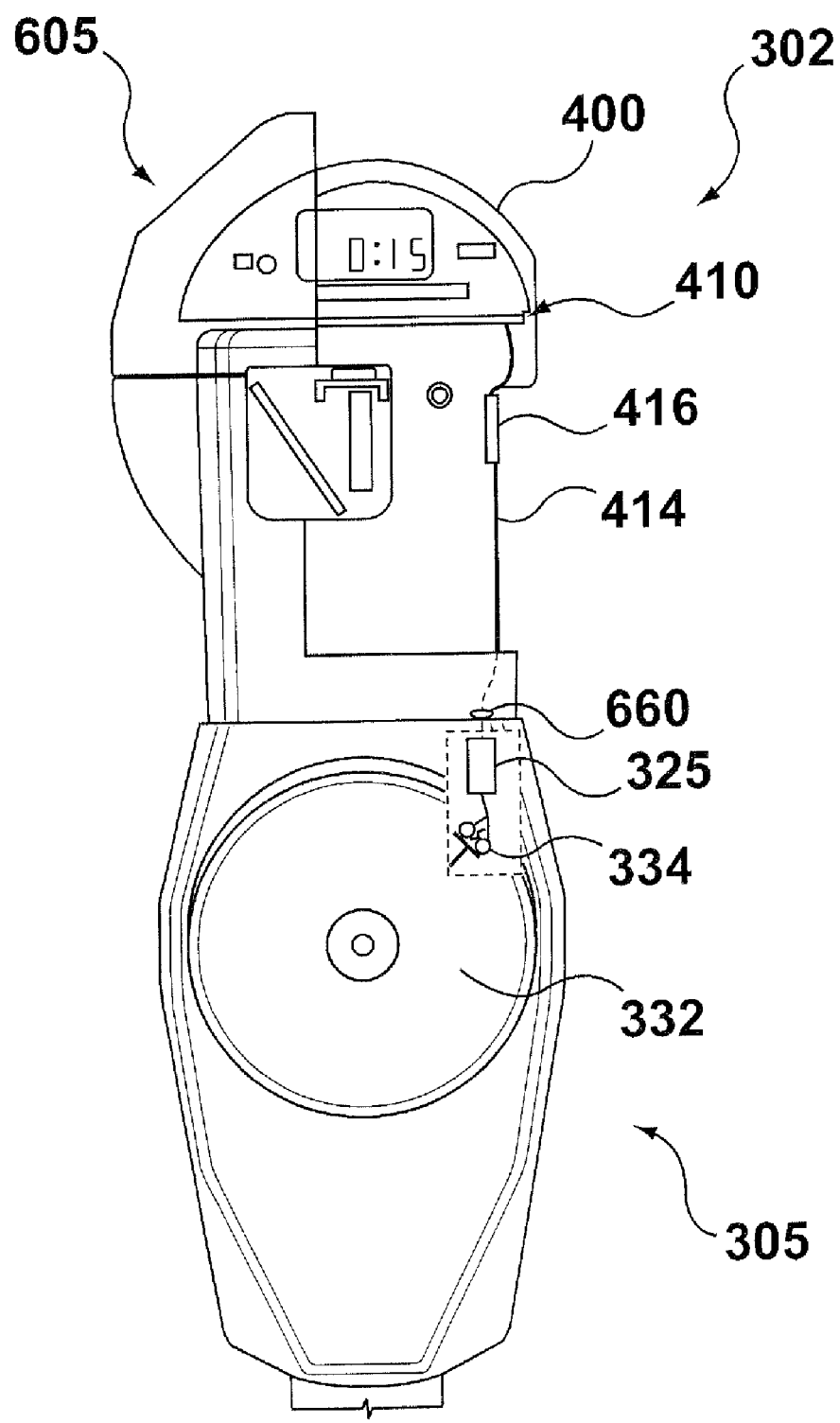

FIG. 6c depicts in a schematic an illustrative parking meter in accordance with the parking meter management system 600 of FIG. 6a. The parking meter 605 comprises an electronic meter mechanism 400 such as the one described with reference to FIGS. 4a, 4b, 4c. The meter mechanism 400 may comprise the wireless radio board 410, the peripheral port connector 416, and a housing wiring harness 414. The housing wiring harness 414 may provide all of the interconnects, for example interconnects 322, 324, 323, and 336 of FIG. 3b, necessary for connecting the peripheral components housed in the housing of the parking meter to the peripheral port 416 of the parking meter mechanism 400. The parking meter mechanism 400 may be housed in an upper housing 302 of the parking meter 605. The upper housing 302 may be connected to the lower housing 305. The lower housing 305 may comprise the memory module 325, which may form part of the housing wiring harness 414, a vault door 332, and a vault door switch 334. The vault door switch 334 may provide a signal to the parking meter mechanism indicating that the vault door 332 is open, closed or locked. The signal may be passed to parking meter mechanism via the housing wiring harness 414 connected to the peripheral port connector 416.

Figure 7:
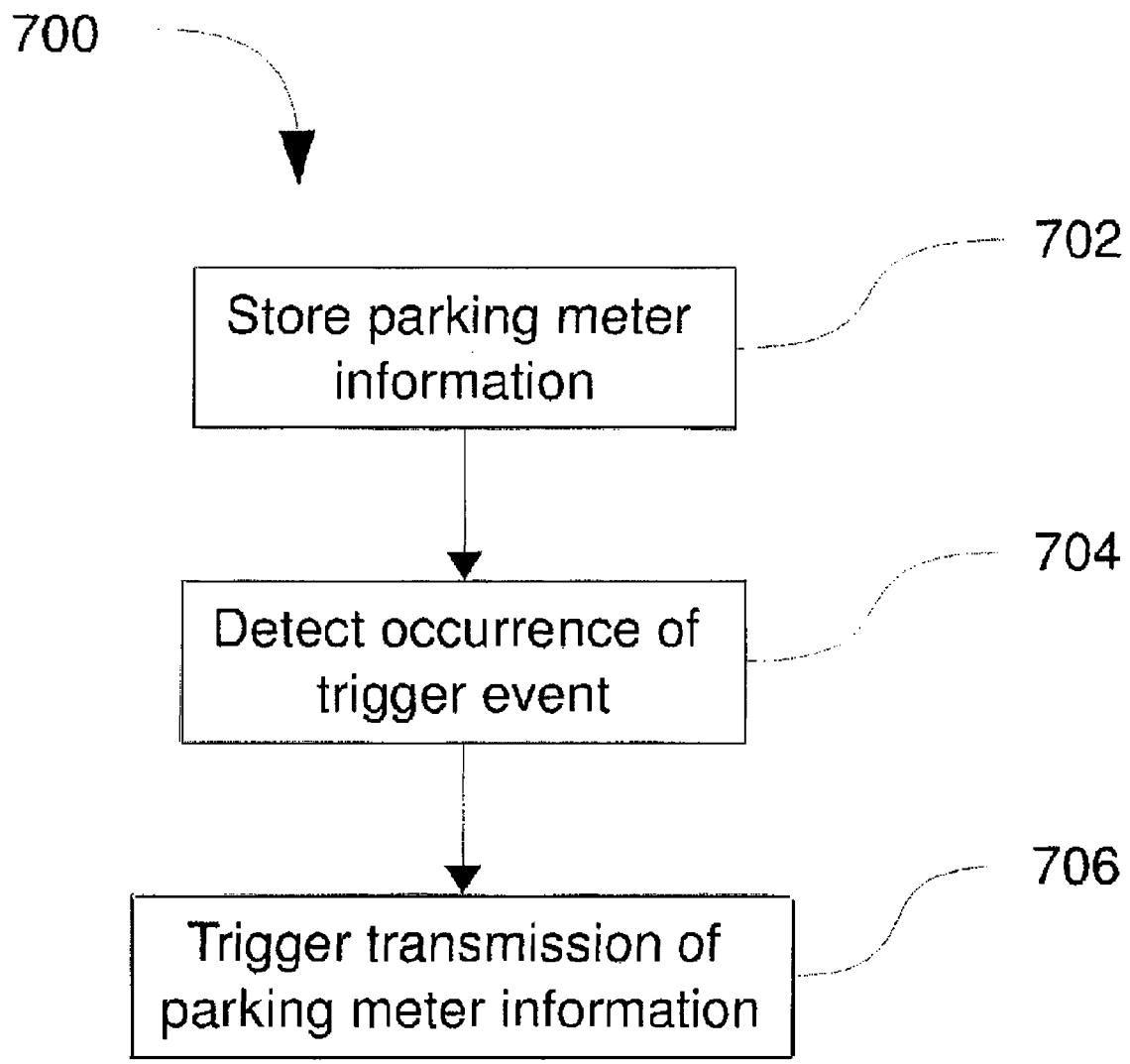
FIG. 7 depicts in a flow chart an illustrative method of transmitting parking meter information.

FIG. 7 depicts in a flow chart an illustrative method of transmitting parking meter information. The method 700 stores parking meter information (702) in a memory of the parking meter. The parking meter then detects a trigger event has occurred that is associated with the receiver being within a transmission range of the parking meter (704). Once the trigger event occurs, the parking meter triggers the transmission of the stored parking meter information (706).

The single space parking meter described above with reference to FIG. 6c allows the parking meter mechanism to be connected to a housing wiring harness 414 which may provide an interconnect to a vault door switch of the parking meter as well as to the radio board of the parking meter. The peripheral port connector 416 of the parking meter mechanism provides an environmentally suitable and robust connector that provides a reliable connection between the parking meter mechanism and the housing wiring harness 414. The peripheral port connector 416 also provides a connector interface to the housing wiring harness 414 that allows meter maintenance staff to easily connect and remove the parking meter mechanism from the housing wiring harness 414 and the outer housing. The parking meter mechanism has the ability to utilize the housing wiring harness 414 to monitor the open/closed/locked status of the vault door of the housing, or more particularly the vault door switch, that it is installed into, as well as to detect when the electrical connection to the housing wiring harness 414 has been broken. The parking meter mechanism may also use the housing wiring harness 414 to provide power to, as well as to read/write data to, a memory device 325 that is remote or separate from the meter main board, but electrically attached to the meter main board via the housing wiring harness 414. The parking meter mechanism may automatically load configuration data found on the memory module 325 attached to the housing wiring harness 414. The configuration information may include the current post/location ID, as well as current zone/rate profile identifier or details, and any other configuration data that would be required by the parking meter mechanism to operate at the correct and proper prevailing rates, time limit and conditions appropriate for that parking zone/area. The parking meter mechanism may also automatically create a time stamped maintenance data record each time the mechanism is attached to or removed from a housing wiring harness 414. The parking meter mechanism may also automatically create a time stamped maintenance data record when there is no response from the memory module 325 after some programmable period of time has elapsed, or a programmable number of attempts has elapsed, or a combination of both.

A single space parking meter in accordance with the present description may have the ability to automatically communicate wirelessly with a receiver that may be carried on the body of a maintenance staff or collections officer or may be carried or mounted to a coin collection cart. Regardless of how the receiver is carried, the parking meter begins transmitting parking meter information when a trigger event associated with the receiver being in close proximity occurs, such as for example a foot to 15 feet. The wireless communication between the parking meter and the mobile access point is preferably not impacted or degraded by paint or scratches on the Lexan® window of the parking meter housing.

Furthermore, the parking meter and the mobile access point may comprise identification information used to verify the communications to ensure that the parking meter only communicates with and/or exchanges data with approved or authorized data collection devices. The parking meter and the mobile access points may each create a time stamped maintenance data record of all data collection events. The parking meter may also create a time stamped maintenance record of all detected vault door openings regardless of the presence of the mobile access point. Audit and maintenance data may be automatically transferred to the mobile access point when the physical coin collection is being carried out, which may be signaled by a vault door switch indicating that the vault door is open.

The data collection carried out during the physical coin collection may be done automatically without any interaction required between the coin collector and the mobile access point. The mobile access point may be able to continue to communicate with the single space meter after the physical coin collection has completed in order to ensure that all of the parking meter information has been transferred. The parking meter may also communicate to the mobile access point that the physical vault door has been placed into the closed and/or locked position following the initial vault door opening. The parking meter may be able to automatically upload and store new rate/profile/configuration information from the mobile access point during the coin collection, either before or after the transmission of the parking meter information. The parking meter may also be able to automatically synchronize its time of day clock with the mobile access point in order to recalibrate and or check its clock. The parking meter may provide a visual indicator to the collections officer or maintenance staff that an audit and/or data transfer is underway and/or is completed, which may include a visual and/or audible indicator that the transmission is underway and/or was successfully completed or not.

In addition to the wireless communication with the mobile access point, the parking meter may also be configured to allow the parking meter to automatically communicate with the remote collection device when a small intelligent probe is inserted, for example into the coin slot, or verifying a maintenance staff's fingerprint or RFID tag. This may allow maintenance staff who are non-collections staff, to easily initiate some data collection tasks, such as transfer of error messages or operating parameters. The mobile access point may normally be attached to the collection cart but may be alternatively carried by the collections officer or maintenance staff. Depending on the battery life of the mobile access point, it may run out of power if carried by the collection staff. The mobile access point if attached to the collection cart may be able to also utilize a second battery pack attached to the collection cart to extend the operating time. Regardless of if the mobile access point is carried by a maintenance staff or collections officer or on the coin collection cart, the battery on the data collection device may be swappable in the field without the loss of data, and the mobile access point may automatically continue its data collection mode without further collector/maintenance officer intervention.

The mobile access point may have a keyboard and a display allowing event data, such as the collection can ID containing the coins to be transferred from the vault of the parking meter to the coin collection cart, to be entered/captured manually. The mobile access point may have the ability to support cellular communications through the addition of a cellular card, in addition to the low power radio, and if so installed, the mobile access point may be configurable to allow and or provide regular scheduled data transmissions to the back end host system while the collectors or maintainers are still in the field. The mobile access points may support 802.11a/b/g/n (Wi-Fi) communications, such that when the collection carts with attached devices are returned to a meter/collection depot and docked into their charging cradles the collected parking meter information can be automatically and wirelessly transferred to the back end host system. Additionally or alternatively the mobile access points may transfer the collected parking meter information to the back-end host system using a wired connection.

While the above description has described illustrative parking meters, methods of transmitting parking meter information and a parking meter management system, it is understood that modifications and adaptations are possible to provide additional features, or remove un-required or un-desired features, as would be understood by one of ordinary skill in the art. Furthermore, the functionality provided by individual components may be combined into fewer components, or may be provided by additional components as would be understood by one of ordinary skill in the art.

What is claimed is:

1. A parking meter comprising:
   a payment mechanism comprising a coin chute for receiving coins as payment for parking space;
   a coin vault for holding the coins received at the coin chute;
   a vault door providing access to the coin vault;
   a vault door switch coupled to the vault door for providing a vault door signal indicating the vault door is open;
   a memory for storing parking meter information including information on the payment received;
   a transmitter for transmitting information to a receiver;
   a processor for executing instructions and providing:
   a transmitting unit for transmitting the parking meter information stored in the memory using the transmitter; and
   a trigger unit for triggering the transmission of the parking meter information when a trigger event associated with the receiver being within a transmission range is received, wherein the trigger event to trigger the transmission of the parking meter information is the vault door signal indicating the vault door is open.

2. The parking meter as claimed in claim 1, further comprising:
   a card reader for accepting payment from an electronic purse or a credit card.

3. A parking meter system comprising:
   a parking meter comprising:
   a payment mechanism for receiving payment for a parking space;
   a memory for storing parking meter information including information on the payment received;
   a transmitter for transmitting information;
   a processor for executing instructions and providing:
   a transmitting unit for transmitting the parking meter information stored in the memory using the transmitter; and
   a trigger unit for triggering the transmission of the parking meter information when a trigger event associated with a receiver being within a transmission range is received, wherein the trigger event is a vault door signal indicating a vault door of the parking meter is opened in order to retrieve coins from the parking meter;
   a coin collection cart for receiving coins retrieved from a plurality of parking meters including the parking meter; and
   said receiver housed within a terminal device for receiving the parking meter information from the transmitter.

4. The parking meter system as claimed in claim 3, wherein the terminal device is carried on one of:
   a collection officer's body;
   a maintenance worker's body; or
   the coin collection cart.

5. The parking meter system as claimed in claim 3, further comprising a back-end computer system for receiving the parking meter information from the terminal device.

6. A method of transmitting parking meter information comprising:
- storing parking meter information in a memory of the parking meter;
- generating a signal indicating that a receiver is within a transmission range of the parking meter, wherein the signal is generated by a switch coupled to a parking meter vault door that is opened when collecting coins from the parking meter;
- detecting at the parking meter an occurrence of a trigger event indicating that the receiver is within the transmission range of the parking meter, wherein detecting the occurrence of the trigger event comprises receiving the generated signal; and
- triggering the transmission of the parking meter information stored in the memory.

7. The method of claim 6, further comprising transferring the parking meter information to a back-end system.

8. The method of claim 6, wherein the step of storing parking meter information comprises one or more of:
- storing a total coin count for different denominations of coins received by the parking meter;
- storing a total count for cashless payments made at the parking meter using chip cards, electronic purses or credit cards;
- storing a last collection date indicating a previous date that coins were removed from the parking meter;
- storing the previous date that parking meter information was collected from the parking meter;
- storing a current collection date indicating when coins were collected;
- storing when parking meter information was collected from the parking meter;
- storing purchase times indicating the dates/times when parking was paid for;
- storing an operating time indicating an amount of time the processor or main board electronics were in an operating mode
- storing an indication of an amount of time the processor or main board electronics were in a sleep mode;
- storing self diagnostic tests results indicating results of self diagnostic tests run by the parking meter;
- storing durations of any errors or malfunctions encountered by the parking meter; and
- storing a state of the vault door including open, closed or locked.

* * * * *